United States Patent [19]

Ziskind

[11] 4,285,441
[45] Aug. 25, 1981

[54] VENTABLE STEAM COVER FOR CULINARY VESSELS

[75] Inventor: Stephen A. Ziskind, New York, N.Y.
[73] Assignee: Foxy Products, Inc., New York, N.Y.
[21] Appl. No.: 152,641
[22] Filed: May 23, 1980

Related U.S. Application Data

[63] Continuation-in-part of Ser. No. 121,057, Feb. 13, 1980.

[51] Int. Cl.³ ...................... B65D 51/00; B65D 51/16
[52] U.S. Cl. .................................... 220/231; 220/287
[58] Field of Search ............................. 220/231, 287; 126/299 C, 389

[56] References Cited

U.S. PATENT DOCUMENTS

| | | | |
|---|---|---|---|
| 909,284 | 1/1909 | Collins | 220/287 |
| 946,271 | 7/1910 | Reeves | 220/231 |
| 2,573,719 | 11/1951 | Lebherz | 220/231 |
| 2,760,672 | 8/1956 | Cronheim | 220/287 |
| 3,047,186 | 7/1962 | Serio | 220/231 |

FOREIGN PATENT DOCUMENTS 139983 3/1920 United Kingdom .................... 220/231

Primary Examiner—George E. Lowrance
Attorney, Agent, or Firm—Natter & Natter

[57] ABSTRACT

A ventable steam cover for a culinary vessel includes a curvilinear wall forming an enclosed chamber to provide a modified convectional cooking atmosphere. The curvilinear wall has an annular seating rim for engagement over a range of different sizes and types of cookery. A flange depending from the annular rim centers the steam cover over the mouth of the vessel. A handle assembly incorporates a valve plate rotatably mounted for selective displacement to release the vapor and for introducing a flavor ingredient. A hooded vent deflects the escaping gases away from a hand engageable knob portion.

10 Claims, 3 Drawing Figures

U.S. Patent  Aug. 25, 1981  4,285,441
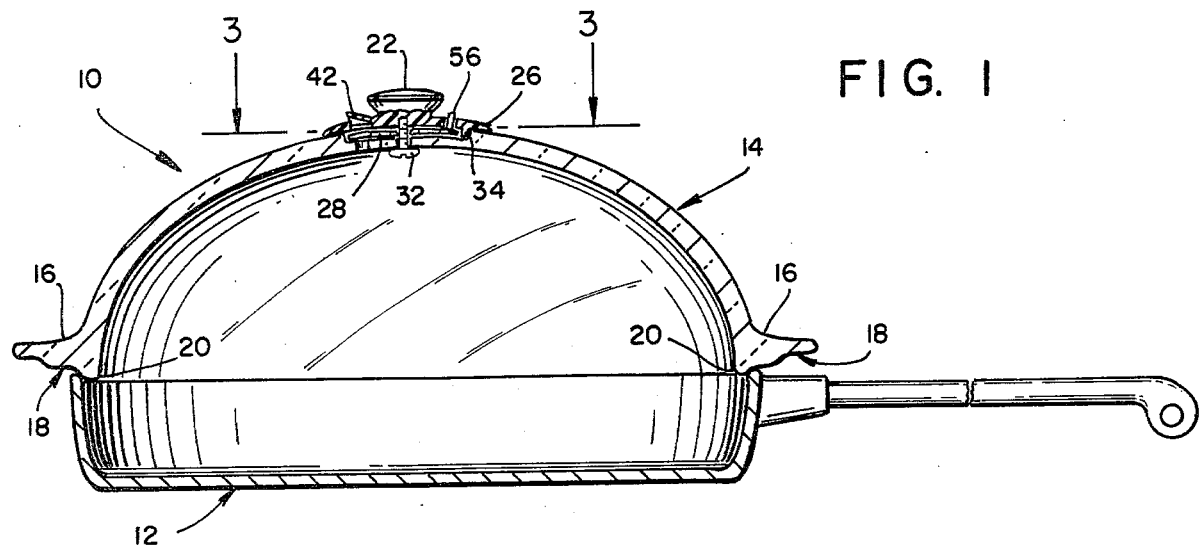
FIG. 1
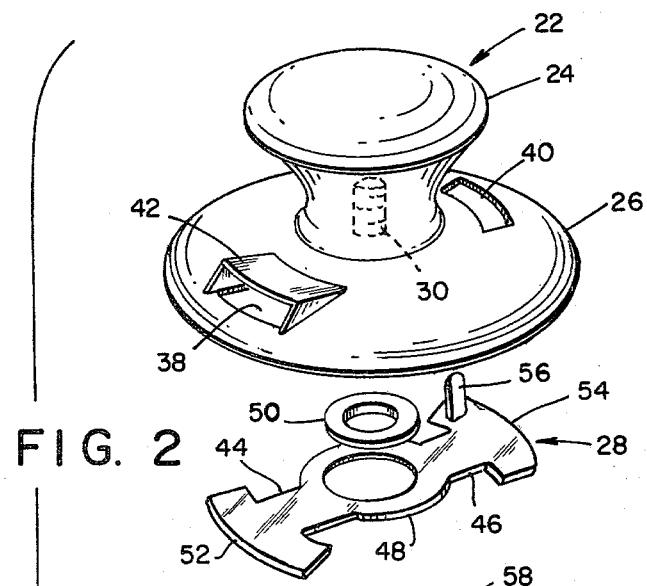
FIG. 2
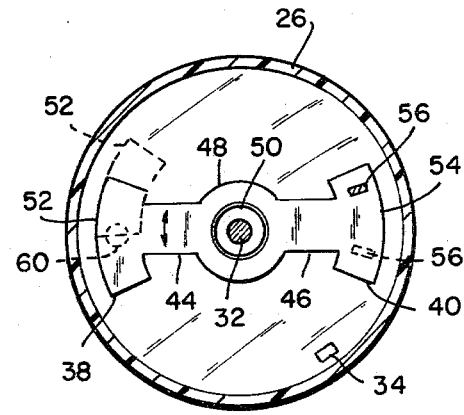
FIG. 3
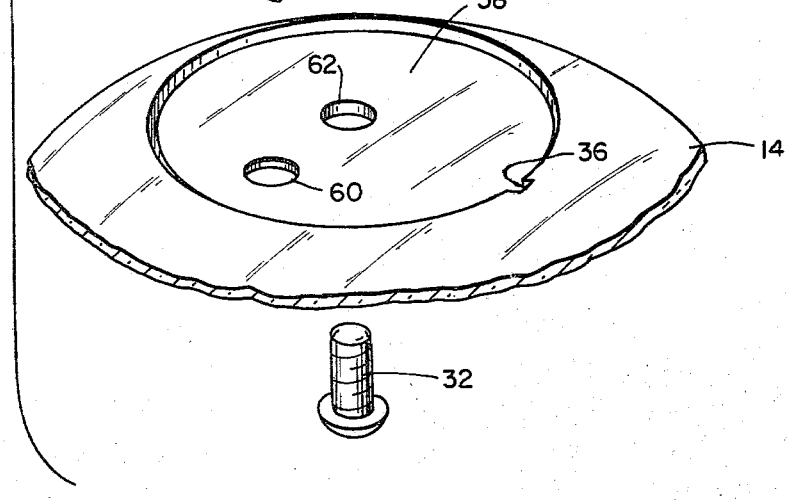

VENTABLE STEAM COVER FOR CULINARY VESSELS

CROSS-REFERENCE TO RELATED APPLICATION

This application is a continuation-in-part of application Ser. No. 121,057 filed Feb. 13, 1980.

BACKGROUND OF THE INVENTION

1. Field of the Invention

This invention pertains to culinary utensils and especially to a ventable steam cover for use with cookery.

In particular, the steam cover of this invention concerns an enclosure device for cooking foods within a modified atmosphere.

2. Description of the Prior Art

Many prior attempts have been made in the field of culinary arts for providing apparatus to facilitate and improve upon cooking procedures and the preparation of foods.

In connection with heat treatment of foods, several prior devices incorporated self-basting covers to promote the condensation of vaporized juices of foods and to direct and redistribute the juices over the foods. Many of those devices utilized perforated covers as shown in U.S. Pat. Nos. 1,598,222 and 1,735,589. A disadvantage of those covers was that there was no ventilation control. A further shortcoming was that those prior devices provided a rather narrow annular marginal portion or lip and were designed for use with corresponding size roasting pots or frying pans and therefore were not readily interchangeable for use with different cookery.

The prior art also included covers that utilized an absorbent material for collecting vaporized grease from these escaping gases. Although a vented cover was utilized in conjunction with a cooking utensil as illustrated in U.S. Pat. No. 926,163, that cover did not utilize a hooded vent and further did not provide protection for the user's hand from inadvertently being burned by the escaping gases.

SUMMARY OF THE INVENTION

The nature of this invention concerns a ventable steam cover for cooperative use with different size cooking vessels. The function of the steam cover is to provide moist heat treatment of food in a manner to enhance the flavor and improve upon the cooking characteristics. It is contemplated that any heat source can be adequately used, such as electric, gas or microwave energy.

The steam cover provides a closure chamber positionable over a cooking pot such that when the food contents are heated, a modified convection atmosphere can be maintained immediately above and surrounding the food.

Accordingly, the cover is formed in a semispherical or domelike configuration having a central opening surrounded by an annular rim for seating over the mouth of the cooking vessel. The annular rim includes a depending flange for improving the seal with a cooking vessel. The annular rim is of a sufficient width dimension for interchangeable use with a wide selection of cookery.

A feature of this invention relates to the handle assembly which incorporates an improved valve arrangement for safer and more reliable operation.

A valve plate is employed which is rotatably mounted about a bushing. The valve plate further includes a vent closure portion which is selectively displaceable over an outlet orifice in the steam cover for regulating the release of the gases contained within the enclosure. It is also contemplated that the vent opening can provide an inlet for the infusion of a liquid flavoring ingredient such as wine.

An important advantage of this invention concerns the simplicity of construction wherein a single screw fastener is utilized for attaching the assembly to the steam cover. Furthermore, the valve assembly is rotatable about the screw in a manner which will not tend to loosen the fastener or handle.

A further advantage of this invention concerns the flared marginal construction forming the annular rim. This arrangement provides adaptability for accommodation with different types of cooking vessels.

Having thus summarized the invention, it will be seen that it is an object of the present invention to provide a steam cover for a cooking utensil of the general character described which is not subject to the disadvantages of the prior art.

Specifically, it is an object of this invention to provide a steam cover for a cooking utensil which is adapted to provide a modified moist atmosphere surrounding the food contained within the cooking vessel and for circulating the hot air.

It is further object of this invention to provide a steam cover for a cooking utensil having an annular seating rim suitable for interchangeable use with several types of cookery.

A still further object of this invention is to provide a steam cover for a cooking utensil having a rotatable valve plate for controlled venting to release heated gases in the closure and further to create convection currents for improved cooking characteristics.

An additional object of this invention is to provide an improved handle assembly including a hooded vent opening for providing safer operation when venting escaping gases.

The above and other objects, features and advantages of this invention will be apparent from the following description of the preferred embodiment when considered in connection with the accompanying drawings.

BRIEF DESCRIPTION OF THE DRAWINGS

In the accompanying drawings in which is shown a preferred embodiment of this invention:

FIG. 1 is a sectional view of a steam cover for a cooking utensil in accordance with this invention and typically shows its use in conjunction with a frying pan;

FIG. 2 is an exploded perspective view of the handle assembly to an enlarged scale; and FIG. 3 is an enlarged view taken substantially along line 3—3 of FIG. 1 and shows the valve plate in a closed position sealing the outlet orifice and also the alternate open position as indicated in dashed lines and by the arrows showing the direction of displacement.

DESCRIPTION OF THE PREFERRED EMBODIMENT

Referring now in detail to the drawings, the reference numeral 10 denotes generally an exemplary embodiment of a ventable steam cover for culinary vessels in accordance with this invention.

The steam cover 10 is shown in FIG. 1 in a typical application for use with a frying pan 12. In a preferred construction, the steam cover 10 is made of a transparent oven-proof glass such as Pyrex; however other materials adapted to withstand elevated cooking temperatures may also be used.

The illustrated steam cover 10 is substantially identical to that discussed in the copending application identified herein and has a generally domelike configuration which can also be hemispherical and is formed with an arcuate contoured imperforate wall 14. The periphery of the wall 14 has a flared marginal portion forming an annular seating rim 16. The seating rim 16 extends radially with respect to a vertical axis passing through the center of the cover 10. The contoured wall 14 further has a substantially horizontal step contact surface 18. A peripheral flange 20 depends downwardly from the seating rim 16 as an extension of the interior of the curved wall 14. The flange 20 describes a circular opening and also functions as a centering collar as will be further described hereinafter.

As illustrative of typical dimensions for the steam cover 10, it has been found that a circular opening of approximately 24-26 centimeters in diameter and an internal height measured along the vertical axis of about 8-10 centimeters provides a chamber volume suitable for most home cooking applications. The curved wall 14 can have an approximate thickness of 5-8 millimeters, with the annular rim extending radially approximately 3-4 centimeters from the flange 20. Although the exemplary embodiment has a generally domelike configuration, it should be apparent that other shapes and contours can also be effectively utilized.

Referring again to the steam cover 10, a handle assembly 22 is provided to facilitate placement and removal of the cover 10 from the pan 12. The handle assembly 22 is preferably made of a molded heat resistant plastic such as Bakelite or of an equivalent material. As previously mentioned, the handle assembly 22 includes a valve arrangement for accessing the enclosed space circumscribed by the cover 10. For this purpose, the handle assembly 22 is provided with a knob portion 24 terminating in a flared skirt 26 which conforms generally to the contour of the wall 14. A rotatably mounted valve plate 28 is recess mounted in the wall 14 below the skirt 26. The knob portion 24 is provided with an internally threaded bore 30 for receiving a screw 32 which secures the handle assembly 22 to the wall 14. It should be further noted that the underside of the skirt 26 has an alignment stud 34 for reception within a keyway 36 which will be further described hereinafter.

The skirt 26 is also provided with two opposed openings forming a vent window 38 and a control window 40. In addition, the vent window 38 is shielded by a hood 42 as shown. The valve plate 28 is constructed of a heat resistant plastic or equivalent material and is substantially planar and formed with two radial arms 44, 46 extending from a central circular hub 48. The hub 48 is journalled about a bushing 50 which is mounted on the screw 32. A vent closure segment 52 is formed integrally with the radial arm 44 and conforms generally to the shape of the vent window 38 being a truncated circular segment. A corresponding positioning segment 54 is found on the opposite radial arm 46 in confronting relationship with the control window 40. A position indicator tab 56 extends upwardly from the segment 54 through the control window 40 for manual displacement to control the movement and orientation of closure segment 52 with respect to an outlet orifice 60 in the wall 14.

Referring now to the upper portion of the curved wall 14, it should be noted that a circular recessed area 58 is adapted for receiving the valve plate 28. In addition, two apertures are provided through the wall 14 and include the outlet orifice 60 and a screw passageway 62. In addition, the previously referred to keyway 36 is provided in the periphery of the recessed area 58 to receive the alignment stud 34 when assembling the handle assembly components and will insure that the windows 38, 40 register with the vent closure segment 52 and positioning segment 54, respectively, and further that the vent closure segment 52 overlies the outlet orifice 60. In addition, the alignment stud prevents inadvertent displacement of the windows 38, 40 by rotation of knob 24 during handling of the steam cover 10.

It should be noted that, when the handle assembly 22 is in its operative position as shown in FIG. 1, the screw 32 extends through passageway 62, bushing 50 and is threaded within the bore 30. In operation, the steam cover 10 of this invention is intended for culinary use with a range of different sizes and types of cookery. For this purpose, the seating rim 16 is provided with a relatively broad radial extension and, when placed over the mouth of the vessel, the flange 20 centers the cover 10. The edges of the cooking utensil, such as the pan 12 illustrated in FIG. 1, contact the stepped surface 18 of the seating rim 16. If the mouth opening of the vessel 12 is greater than that shown, the steam cover 10 can still be used with vessel openings to approximately 30 centimeters in diameter. It should thus be apparent that the steam cover 10 will encompass a large selection of commonly used pots and pans. The weight of the steam cover 10, in cooperation with the flange 20, will thus provide an effective seal preventing the internal cooking fumes and gases from escaping from around the edge of the vessel.

With regard to the venting of internal gases and the implementation of convection currents within the cover 10, reference is made to FIG. 3. The positioning segment 54 can be moved by applying pressure to the indicator tab 56. By so displacing the positioning segment 54, corresponding movement of the vent closure segment 52 will progressively expose the outlet orifice 60. The exhaust steam and vapors can then exit through the vent window 38 for deflection by the hood 42 away from the knob portion 24 and will thus protect the user's hands from hot steam vapor. In addition, the heated air within the cover will be caused to circulate around the food.

It should thus be apparent that the outlet orifice 60 also provides ingress for the infusion of cooking ingredients which can be poured into the cover 10 through the window 38.

In addition it should be obvious that the steam cover 10 is suitable for providing a modified atmosphere which will enhance the heat treatment of foods within a moist atmosphere and will also provide selected accessing for ingress and egress from the food within the steam cover 10.

There is thus provided a ventable steam cover for a cooking utensil which achieves the various objects of the invention and which is well adapted to meet the conditions of practical use. Since various possible embodiments of this invention might be made and since certain changes may be made in the above construction without departing from the spirit and scope of the invention, it is to be understood that all material contained in the above description or shown in the accompanying drawings shall be interpreted as illustrative and not in a limiting sense.

It is also to be understood that the following claims are intended to cover all of the generic and specific features of the invention herein described.

Having thus described the invention, there is claimed as new and desired to be secured by Letters Patent:

1. A ventable steam cover for a culinary vessel adapted to provide a modified enclosed atmosphere comprising cover means for defining a closure chamber having a central opening, seating means integral with said cover including an annular rim, handle assembly means including a knob portion for positioning the central opening over the vessel, said knob portion including a flared skirt, said skirt having at least one window, an outlet orifice in said cover, said window being positioned over the outlet orifice, valve means interposed between said skirt and outlet orifice, said valve means being displaceable for progressively exposing the outlet orifice whereby exhaust steam and vapors can vent through the window.

2. A ventable steam cover for a culinary vessel as claimed in claim 1 wherein the annular rim extends radially with respect to a vertical axis passing through the center of the cover and further including fastener means for securing the handle assembly to the cover.

3. A ventable steam cover as claimed in claim 2 wherein the valve means includes a central hub journalled about a bushing surrounding the handle assembly fastener.

4. A ventable steam cover as claimed in claim 3 wherein the valve means includes a vent closure segment selectively displaceable over the outlet orifice.

5. A ventable steam cover as claimed in claim 4 wherein the valve plate includes a positioning segment, said positioning segment including indicator tab means for rotating the valve plate.

6. A ventable steam cover as claimed in claim 1 wherein the valve means comprises a pivotally mounted, substantially planar valve plate having an opposed vent closure segment and a positioning segment.

7. A ventable steam cover as claimed in claim 1 wherein the flared skirt includes two windows with the vent window being aligned over the outlet orifice, and a control window, an indicator tab extending from the valve means, said indicator tab being displaceable within the margin of the control window for rotatably displacing the closure segment for progressively exposing the outlet orifice, for venting through the vent window.

8. A ventable steam cover as claimed in claim 7 wherein the cover is provided with a circular recessed area for accommodating the valve plate, said recessed area including a keyway, an alignment stud projecting downward from the flared skirt, said alignment stud being adapted for accommodation within the keyway for aligning the vent window with the outlet orifice.

9. A ventable steam cover as claimed in claim 7 wherein the vent window is provided with a hood for deflecting heated gases away from the knob portion of the handle assembly.

10. A ventable steam cover as claimed in claim 1 wherein the seating means further includes annular flange means depending from the rim for centering the cover over the mouth of the vessel, said flange means also providing a seal for containment of the cooking vapors within the cover.

* * * * *